Aug. 29, 1944.　　　J. T. STATTNER　　　2,357,061
CLOCK CONTROL FOR RADIOS
Filed April 1, 1942　　　4 Sheets-Sheet 1

INVENTOR.
JOSEPH T. STATTNER
BY
Carl Miller
ATTORNEY.

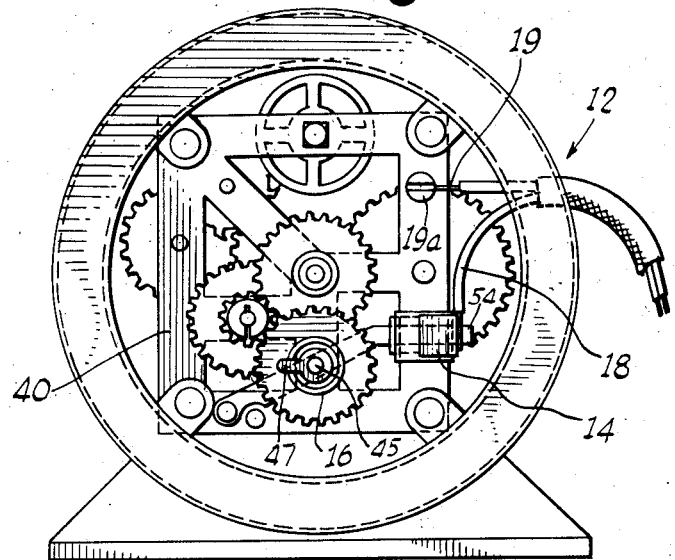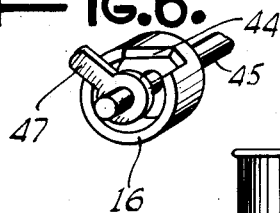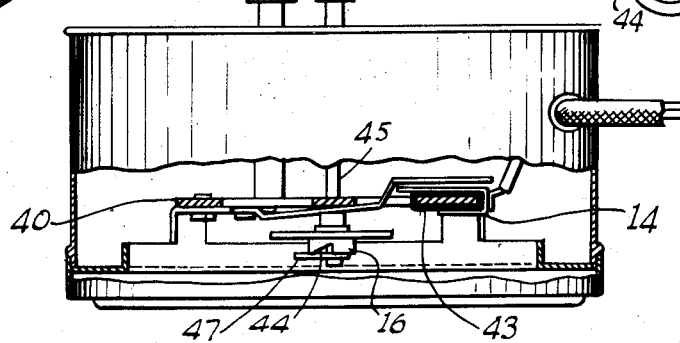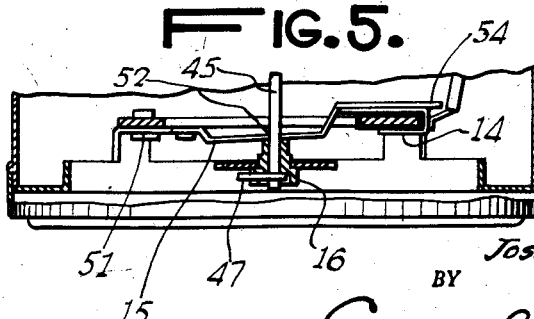

Aug. 29, 1944.　　J. T. STATTNER　　2,357,061
CLOCK CONTROL FOR RADIOS
Filed April 1, 1942　　4 Sheets-Sheet 3
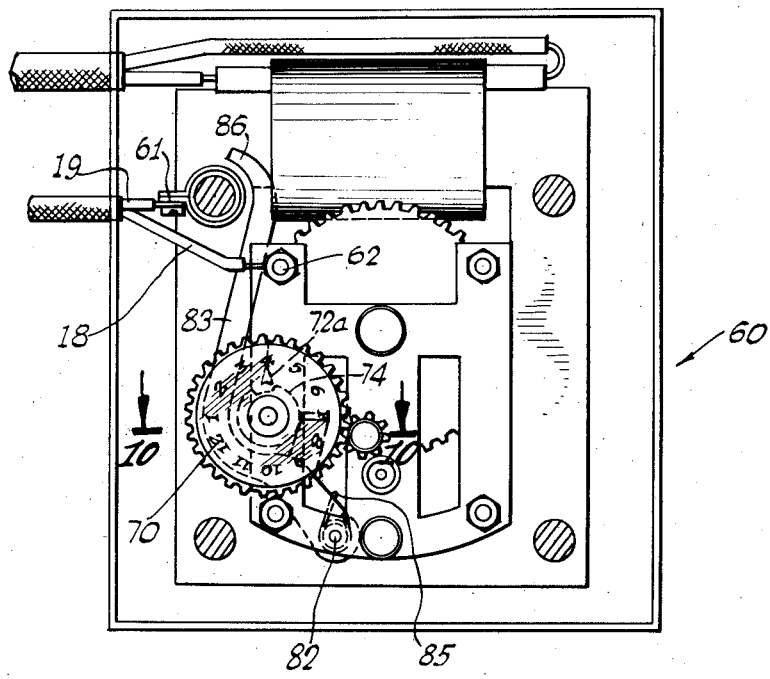
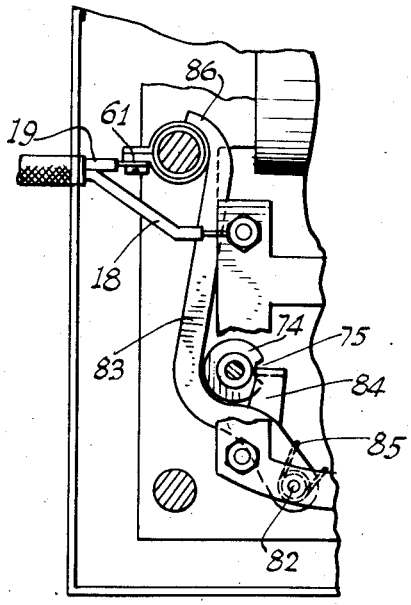
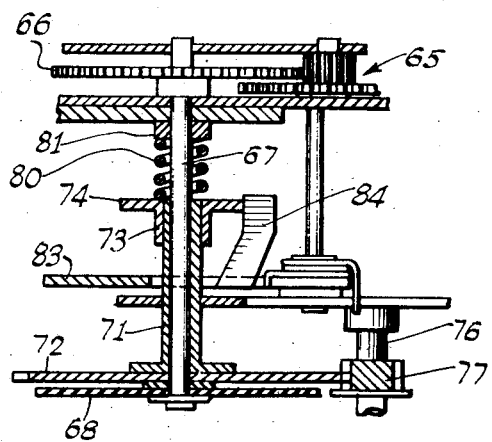
INVENTOR.
JOSEPH T. STATTNER
BY
Carl Miller
ATTORNEY.

Aug. 29, 1944.  J. T. STATTNER  2,357,061
CLOCK CONTROL FOR RADIOS
Filed April 1, 1942  4 Sheets-Sheet 4
FIG.11.
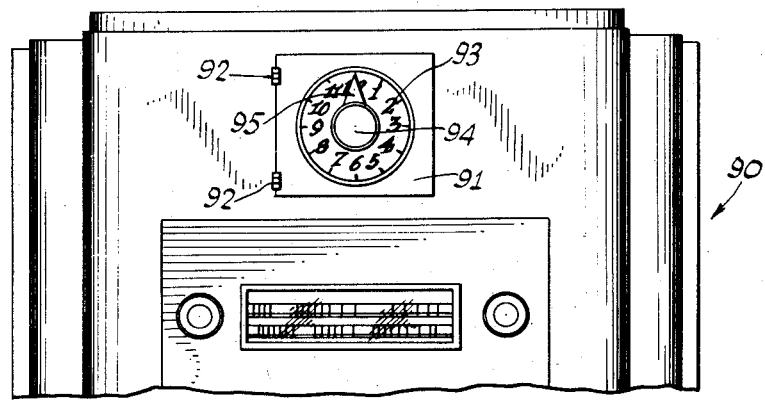
FIG.12.
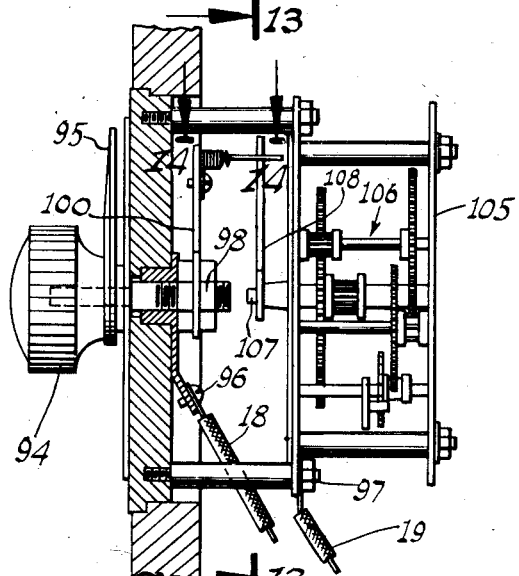
FIG.13.
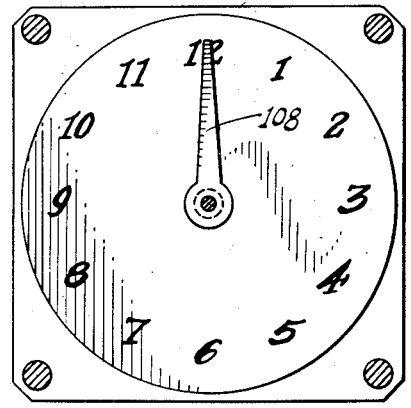
FIG.15.
FIG.14.
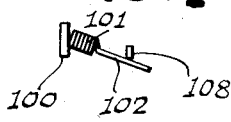
INVENTOR.
JOSEPH T. STATTNER.
BY
Carl Miller
ATTORNEY.

Patented Aug. 29, 1944

2,357,061

UNITED STATES PATENT OFFICE 2,357,061

CLOCK CONTROL FOR RADIOS

Joseph T. Stattner, New York, N. Y.

Application April 1, 1942, Serial No. 437,190

2 Claims. (Cl. 161—1)

This invention relates to clock control for radio.

An object of this invention is to provide an automatic time switch for radio, controlled by mechanical and electrical alarm clocks, to turn any radio receiving set on and off, so that any desired breakfast program selected may be automatically tuned in and out at desired times.

The advantages of this construction are as follows:

(1) You may stay in bed and be awakened by your favorite music or exercise program, and said program will stay on for a predetermined period of time and then shut off automatically.

(2) By setting the dials and time switch ahead of time, a person may go about his work, and the desired program will come on, thereby avoiding the possibility of forgetting to tune in manually on some good story or speech or some other program.

Still another object of this invention is to provide a simple and durable mechanism of the character described, which shall be easy to attach to any radio, which shall be relatively inexpensive to manufacture, and yet practical and efficient to a high degree.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawings, in which is shown various possible illustrative embodiments of this invention, Fig. 1 is a front elevational view of a radio with an alarm clock thereon, to control turning on and off the radio;

Fig. 3 is an elevational view of part of the clock mechanism, illustrating the time control switch;

Fig. 4 is a top plan view of the structure shown in Fig. 3, with parts broken away and in cross-section, and showing the switch in "off" position;

Fig. 5 is a view similar to Fig. 4, but showing the switch in "on" position;

Fig. 6 is a perspective view of a detail of the switch in "off" position;

Fig. 7 is a perspective view similar to Fig. 6, and showing the position of the part when the switch is "on";

Fig. 8 is a front elevational view of an electric alarm clock to control the "on" and "off" switch of the radio, embodying the invention, and illustrating a modified construction, and showing the switch in "off" position;

Fig. 9 is a partial view similar to Fig. 8, but showing the switch in "on" position;

Fig. 10 is a cross-sectional view taken on line 10—10 of Fig. 8;

Fig. 11 is a front elevational view of a radio with a clock to control the "on" and "off" switch of the radio, and incorporated into the radio;

Fig. 12 is an elevational, transverse, cross-sectional view of the clock mechanism;

Fig. 13 is a cross-sectional view taken on line 13—13 of Fig. 12;

Fig. 14 is a cross-sectional view taken on line 14—14 of Fig. 12; and

Fig. 15 is a perspective view illustrating a detail.

Figure 1:
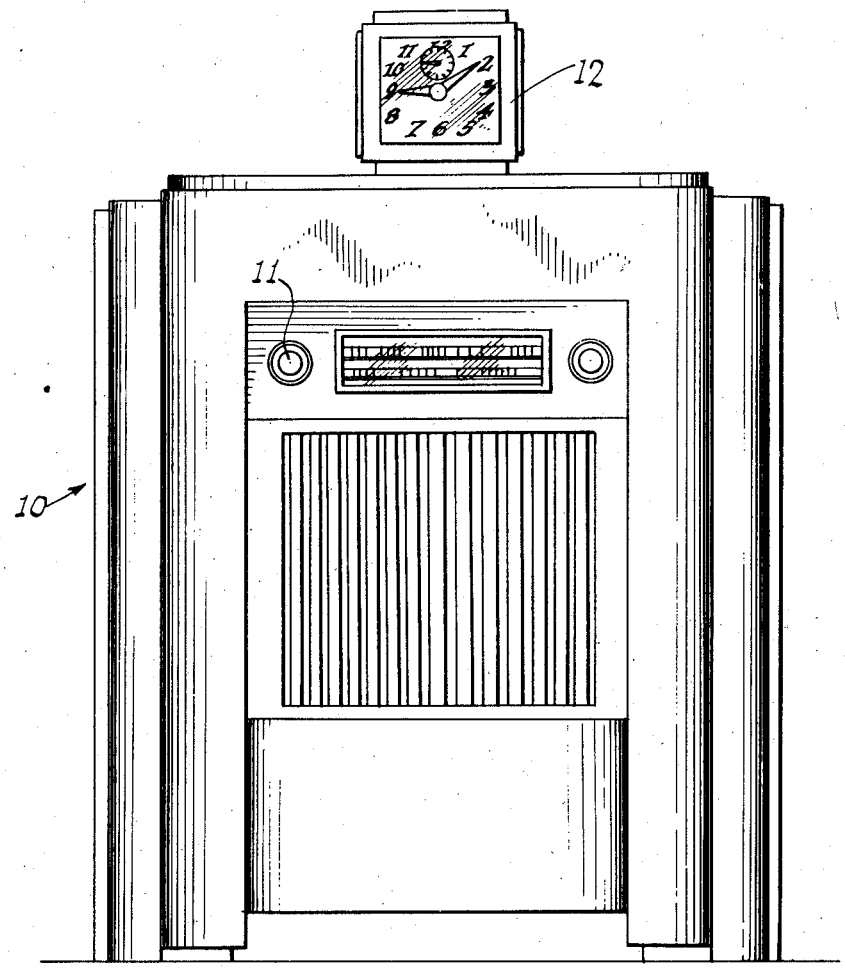

Referring now in detail to the drawings, 10 designates a radio provided with an "on" and "off" switch dial 11. Mounted on the radio is a clock 12 adapted to control the turning on or off of the radio in a manner hereinafter appearing. The clock 12 comprises a switch 13 having contacts 14 and 15. The contact 15 is movable and is controlled by a cam 16 connected to the clock train and adapted to make one revolution every twelve hours.

Means is provided to close the switch 13 at any predetermined set time, as will be hereinafter described. The switch contacts 14 and 15 are connected by wires 18 and 19 to a plug 20 having blades receivable in a socket 21. The terminals in the socket 21 are connected to wires 22 and 23, respectively. Wire 22 is connected to a terminal of a plug 24 adapted to be inserted in a wall receptacle. Connected to the other terminal of the plug 24 is a wire 25 which is connected to one side 26 of the radio on the receiving set. Wire 22 is also connected by wire 27 to one terminal of a manual "on" and "off" switch 28. The other terminal of the "on" and "off" switch 28 is connected by wire 29 to a spring contact 30. Wire 23 is connected to spring contact 31. Adjacent contact 30 is another spring contact 32, connected by wire 33 to the other side 34 of the radio receiving set.

The "on" and "off" dial 11 of the radio, has an arm 11a, adapted to press the switch contacts 30, 31 and 32 into mutual contact when turning the dial to "on" position. When the dial is turned to "off" position, the switch contacts 30, 31 and 32 separate from one another.

It will now be understood that when the dial 11 is turned to "on" position, and the "on" and "off" switch 28 is "on," the radio will be tuned in. When the dial 11 is turned to "off" position, the radio will be tuned out. However, when the "on" and "off" switch 28 is turned to "off" position, turning of the dial 11 to "on" position will not tune in the radio until the switch 13 is closed, in the manner hereinafter appearing.

Wire 23 may be permanently attached to wire 29, thus eliminating the switch contact 31. It will be noted that the clock control switch 14 and 15 is shunted across the "on" and "off" switch 28.

It will be noted that the plug 20 may be disconnected from socket 21, in which case, the switch 28 is turned "on" so that the radio will operate in the usual manner.

The mechanism for turning the switch "on" and "off" will now be described:

Referring to Figs. 3, 4, 5, 6 and 7, the clock 12 may be in the form of a usual alarm clock. The alarm clock comprises a frame 40. The wire 19 may be connected to a binding post 19a on the frame 40. The wire 18 is connected to a terminal 14, likewise mounted on the frame 40, but insulated therefrom by an insulating sleeve 43.

Connected to the clock train of the clock, is the cam 16. Said cam makes one revolution each twelve hours as stated above. The cam 16 is in the form of a cylindrical collar and has a notch 44. Extending through the collar 16 is a shaft 45 connected to a handle 46. The collar 16 is slidably mounted on shaft 45. Fixed to one end of shaft 45 is a radial arm 47. The handle 46 may be rotated to set the arm 47 at any proper angle to determine the time at which the radio is to be turned "on."

Fixed to the frame 40 is a spring contact 15. The spring contact 15 is fixed at one end thereof to said frame as at 51. The contact 15 is formed with an opening 52, through which the shaft 45 passes. Said spring contact contacts collar 16 and tends to slidably move said collar outwardly on shaft 45. The free end 54 of the spring contact 15 is disposed adjacent the contact 14. When the arm 47 contacts the outer rim of the collar 16, said collar is retracted to push the spring contact 15 to the position shown in Fig. 4, in which position, said spring contact is not in contact with the contact or terminal 14. As the collar 16 rotates with the clock mechanism to a point where the arm 47 enters the notch 44, the spring contact 15 will move the collar 16 from the position shown in Fig. 4 to the position shown in Fig. 5, and the outer end 54 of said spring contact will engage the terminal 14, thus completing the circuit for the radio.

It will be noted that as the clock mechanism continues to operate, the arm 47 will ride out of the notch to again open the switch 15, 14. The shape of the notch may be such as to regulate the length of time during which the switch 15, 14 is closed. The handle 46 may be turned to bring the arm 47 to any desired position, so that the radio will be turned on at any desired time.

Figure 2:
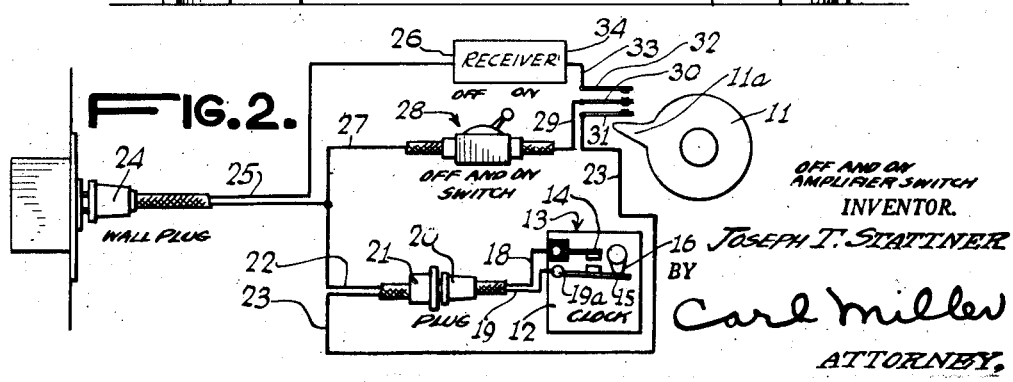
Fig. 2 is a wiring diagram illustrating the electrical connections for the control of the "on" and "off" switch.

In Figs. 8, 9 and 10 there is illustrated an electric clock 60 to control the turning on and off of the radio. Electric clock 60 may be in the form of an electrical alarm clock. Connected to terminals 61 and 62 on the clock, are the wires 18 and 19 which are connected in circuit, as illustrated in Fig. 2 of the drawings.

Clock 60 includes a train of clock gearing 65 including a pinion 66 fixed on a horizontal shaft 67. Fixed to the front of the shaft 67 is a transparent disc 68 marked with a clock face hour dial 70. On shaft 67 is a sleeve 71, to the front end of which is fixed a pinion 72. On the front of pinion 72 is marked a pointer 72a adapted to co-operate with the dial 70 on disc 68. On sleeve 71 is another sleeve 73 carrying a disc 74 formed with a notch 75 in the periphery thereof.

On the frame-work of the clock is mounted a shaft 76 carrying a pinion 77 meshing with the pinion or gear 72. Shaft 76 carries a head adapted to be rotated in the rear of the clock for setting the time at which the radio is to be turned on, as will appear hereinafter.

Rotation of shaft 76 will cause rotation of gear 72 relative to disc 68 to bring the pointer 72a in alignment with the hour on dial 70 at which the radio is to be turned on. The normal operation of the clock mechanism will cause rotation of the cam disc 74, sleeve 71 and gear 72 by means of a coil compression spring 80, received on shaft 67 and interposed between a collar 81 fixed on shaft 67 and the disc 74, as shown in Fig. 10 of the drawings. Thus, when the clock mechanism is operating, gear 72, rotates together with the dial disc 68.

Pivoted to the frame-work of the clock, as at 82, is a lever 83 formed with an integral offset arm 84 contacting the periphery of disc 74 and maintained in engagement with the periphery of said disc by a torsion spring 85 on the pivot shaft 82. The torsion spring 85 tends to rotate the lever 83 in a counterclockwise direction looking at Fig. 8 of the drawings. The upper end 86 of lever 83 is normally held in spaced relation with respect to terminal 61 by the periphery of disc 74, as shown in Fig. 8 of the drawings.

As the disc rotates, however, notch 75 will come into registry with arm 84, permitting the torsion spring 85 to swing lever 83 in a counterclockwise direction into engagement with terminal 61 to complete the circuit between the wires 18 and 19 for turning the radio on. The angular extent of the notch 75 determines the period during which the radio is on. When arm 85 again rides out of the notch and into the periphery of the disc 74, the radio is turned off.

In Figs. 11 to 15 there is disclosed a modified construction in which the radio has a mechanical clock 91 disposed therein and mounted on hinges 92, so that the clock may be swung outwardly about said hinges. On the front of the clock is an hour dial 93 and rotatably mounted thereon, is a handle 94 provided with a pointer 95. Rotation of the handle 94 will set the hour at which the radio is to be turned on. Within the clock are terminals 96 and 97 likewise connected to wires 18 and 19 in the circuit illustrated in Fig. 2 of the drawings.

The dial handle 94 is mounted on a shaft 98 to which the pointer 95 is fixed. Within the clock is an arm 100 likewise fixed to shaft 98 and aligned with the dial pointer 95, so that upon rotating the handle 94, the pointer 95 rotates together with the arm 100 and the two are always in alignment. Attached to the upper end of arm 100 is a coil spring 101 having a portion 102 extending inwardly in a direction parallel to the axis of shaft 98.

The clock 91 comprises a frame 105 in which is mounted a clock gearing 106 including a shaft 107, to which is fixed an arm 108. Shaft 107 is co-axial with shaft 98. The upper end of arm 108 is adapted to contact portion 102 of spring 101. Arm 108 makes one revolution in twelve hours and is very similar to an hour hand. Terminal 96 is fixed to shaft 98, whereas terminal 97 is on the frame of the clock.

When arm 108 contacts spring portion 102, the circuit is completed between wires 18 and 19, to turn on the radio. Thus, by turning handle 94, arm 100 may be set to any desired hour, and at that hour, arm 108 will contact spring 102 to complete the circuit. The circuit will remain complete until arm 108 by-passes spring portion 102. By adjusting the length of spring portion 102, the time during which the radio is on may be adjusted.

It will thus be seen that there is provided a device in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawings is to be interpreted as illustrative and not in a limiting sense.

Having thus described my invention, I claim as new and desire to secure by Letters Patent:

1. In combination with a radio receiving circuit, a wall plug, a wire connecting one terminal of the wall plug to one side of said circuit, a switch element, means to connect said element to the other side of said circuit, a second switch element, a second wire connecting the other terminal of said wall plug with said second switch element, a manual on and off switch interposed in said second wire, a clock controlled switch, a second plug, wires connecting the terminals of the clock control switch with the terminals of said second plug, an electric socket adapted to receive the blades of said second plug, a wire connecting one terminal of said socket to said second wire on one side of the on and off switch, a third switch element, a wire connecting the other terminal of said socket with said third switch element, said first and second switch elements being normally open, but adapted to be interengaged, said third element being normally spaced from one of said first two elements but being movable into contact therewith, a handle, and means on the handle to cause said first and second elements to interengage and said third element to contact one of said first two elements.

2. In combination with a radio receiving set, including a receiving circuit, a wall plug, a wire connecting one terminal of the wall plug with one side of the receiving circuit, a switch adapted to be closed by turning a handle on the radio receiving set, means to connect one contact of said switch with the other side of said radio receiving circuit, a second wire connecting the other terminal of said plug with the other contact of said switch, a manual on and off switch interposed in said second wire, a clock having a switch, and means to close said switch at a predetermined time, a detachable connector having a pair of terminals, wires connecting the same to the terminals of said clock switch, a second detachable connector complementary to said first connector and having a pair of terminals engageable with the terminals of said first connector, conducting means connecting one terminal of said second connector to said second wire on one side of said on and off switch, and means to connect the other terminal of said second connector with said second wire on the other side of said on and off switch, upon closing said first mentioned switch, by operating said handle on the radio receiving set.

JOSEPH T. STATTNER.